United States Patent
Kim

(10) Patent No.: US 12,288,850 B2
(45) Date of Patent: Apr. 29, 2025

(54) ELECTROCHEMICAL CELL INCLUDING A GREENHOUSE GAS

(71) Applicant: Jangwoo Kim, San Marcos, TX (US)

(72) Inventor: Jangwoo Kim, San Marcos, TX (US)

(73) Assignee: WATTRII, INC., Cedar Park, TX (US)

( * ) Notice: Subject to any disclaimer, the term of this patent is extended or adjusted under 35 U.S.C. 154(b) by 6 days.

(21) Appl. No.: 17/306,457

(22) Filed: May 3, 2021

(65) Prior Publication Data
US 2022/0352537 A1 Nov. 3, 2022

(51) Int. Cl.
| | |
|---|---|
| *H01M 10/36* | (2010.01) |
| *H01M 4/38* | (2006.01) |
| *H01M 4/583* | (2010.01) |
| *H01M 4/62* | (2006.01) |
| *H01M 4/66* | (2006.01) |
| *H01M 10/42* | (2006.01) |
| *H01M 4/60* | (2006.01) |
| *H01M 10/02* | (2006.01) |

(52) U.S. Cl.
CPC ............ *H01M 10/36* (2013.01); *H01M 4/38* (2013.01); *H01M 4/583* (2013.01); *H01M 4/624* (2013.01); *H01M 4/625* (2013.01); *H01M 4/662* (2013.01); *H01M 10/4235* (2013.01); *H01M 4/60* (2013.01); *H01M 10/02* (2013.01); *H01M 2300/0002* (2013.01); *H01M 2300/0025* (2013.01)

(58) Field of Classification Search
CPC ........ H01M 10/36; H01M 4/38; H01M 4/624; H01M 4/625; H01M 10/4235; H01M 2300/002
See application file for complete search history.

(56) References Cited

U.S. PATENT DOCUMENTS

| | | | |
|---|---|---|---|
| 3,028,317 A | 4/1962 | Wilson | |
| 3,297,484 A | 1/1967 | Niedrach | |
| 3,484,292 A | 12/1969 | Bonnemay | |
| 3,639,174 A | * | 2/1972 | Kegelman ............. H01M 10/05 |
| | | | 429/339 |
| 9,960,451 B1 | 5/2018 | Zhamu | |

(Continued)

FOREIGN PATENT DOCUMENTS

| | | | |
|---|---|---|---|
| CN | 106025270 | * | 10/2016 |
| GB | 1399214 A | | 6/1975 |

(Continued)

OTHER PUBLICATIONS

Hu, C.-Y & Li, X.-H & Guo, J. & Wang, X.-Y & Yi, T . . . (2007). Reactions between electrolyte and electrode of lithium ion batteries at elevated temperature. Zhongguo Youse Jinshu Xuebao/Chinese Journal of Nonferrous Metals. 17. 629-635.*

*Primary Examiner* — Laura Weiner
(74) *Attorney, Agent, or Firm* — Raven Patents, LLC; Anton E. Skaugset

(57) ABSTRACT

Electrochemical cells that incorporate a greenhouse gas, including an electrode that includes an electrode active material, an electrolyte including an electrolytic solvent, and a housing that encloses the electrode and electrolyte under a gaseous atmosphere including a greenhouse gas, where the electrolyte is in contact with the electrode, and the electrode active material has a solubility of at least 0.01 M in the electrolytic solvent.

12 Claims, 10 Drawing Sheets

(56) References Cited

U.S. PATENT DOCUMENTS

| | | | |
|---|---|---|---|
| 2002/0136947 A1* | 9/2002 | Spillman | H01M 10/0567 |
| | | | 429/231.95 |
| 2003/0175583 A1 | 9/2003 | Suzuki | |
| 2004/0121227 A1 | 6/2004 | Cheng | |
| 2010/0330435 A1* | 12/2010 | Nemeth | H01M 8/184 |
| | | | 429/402 |
| 2012/0214075 A1* | 8/2012 | Johnson | H01M 10/0569 |
| | | | 429/405 |
| 2017/0047564 A1 | 2/2017 | Bianchi | |
| 2017/0077564 A1 | 3/2017 | Wang | |
| 2017/0207449 A1 | 7/2017 | Kang | |
| 2019/0372104 A1 | 5/2019 | Nose | |
| 2020/0035998 A1 | 1/2020 | Lu | |
| 2020/0227792 A1 | 7/2020 | Park | |

FOREIGN PATENT DOCUMENTS

| | | | |
|---|---|---|---|
| JP | 2009-238945 | * | 10/2009 |
| JP | 2016-154123 | * | 8/2016 |
| KR | 2019-0088161 | * | 7/2019 |
| WO | WO 2014/121276 | * | 8/2014 |
| WO | 2022060750 A1 | | 3/2022 |

* cited by examiner

ELECTROCHEMICAL CELL INCLUDING A GREENHOUSE GAS

TECHNICAL FIELD

This disclosure relates generally to electrochemistry, and more specifically to electrochemical cells that include an electrode having an electrode active material, where the electrochemical cell further includes a greenhouse gas.

CROSS-REFERENCE TO RELATED APPLICATIONS

This disclosure relates to subject matter previously disclosed in U.S. application Ser. No. 17/175,267 for HIGH-ENERGY CATHODES AND METHODS FOR MAKING THE SAME (now U.S. Pat. No. 11,374,209), filed Feb. 12, 2021; and U.S. application Ser. No. 17/220,823 for HIGH-ENERGY CATHODES AND METHODS FOR MAKING THE SAME (now U.S. Pat. No. 11,380,893), filed Apr. 1, 2021, both hereby incorporated by reference.

BACKGROUND

Batteries, or electrochemical cells, are ubiquitous in modern technology, being used in a wide range of applications from small electrochemical systems for industrial and medical devices, to larger electrochemical systems for electric vehicles and grid energy storage systems.

The current movement towards the use of electrochemical cells instead of internal combustion engines represents a critical component in a global strategy to mitigate climate change, as such a shift in energy production will reduce overall greenhouse gas emissions.

Perhaps the most well-known and widely-used battery technology at the present are lithium-ion batteries, which use an intercalated lithium compound as one electrode material and employ lithium ions shuttling between the cathode and anode in the pond of electrolyte. While lithium-ion batteries possess many advantages, they also require expensive materials for their manufacture, and provide relatively low energy densities. These drawbacks may adversely impact the widespread adoption of electrochemical energy systems.

What is needed are improved electrochemical cells that can provide greater energy density with more economical manufacturing costs, resulting in a lower cost per unit energy produced, and facilitating the shift toward electrochemical energy over fossil fuels.

SUMMARY

The present disclosure is directed to electrochemical cells that incorporate a greenhouse gas.

In some embodiments, the disclosure is directed to an electrochemical cell comprising an electrode that includes an electrode active material, an electrolyte including an electrolytic solvent; and a housing that encloses the electrode and electrolyte under a gaseous atmosphere, where the gaseous atmosphere includes a greenhouse gas, where the electrolyte is in contact with the electrode, and the electrode active material has a solubility of at least 0.01 M in the electrolytic solvent.

The disclosed features, functions, and advantages of the disclosed electrochemical cells may be achieved independently in various embodiments of the present disclosure, or may be combined in yet other embodiments, further details of which can be seen with reference to the following description and drawings.

DETAILED DESCRIPTION

Figure 1:
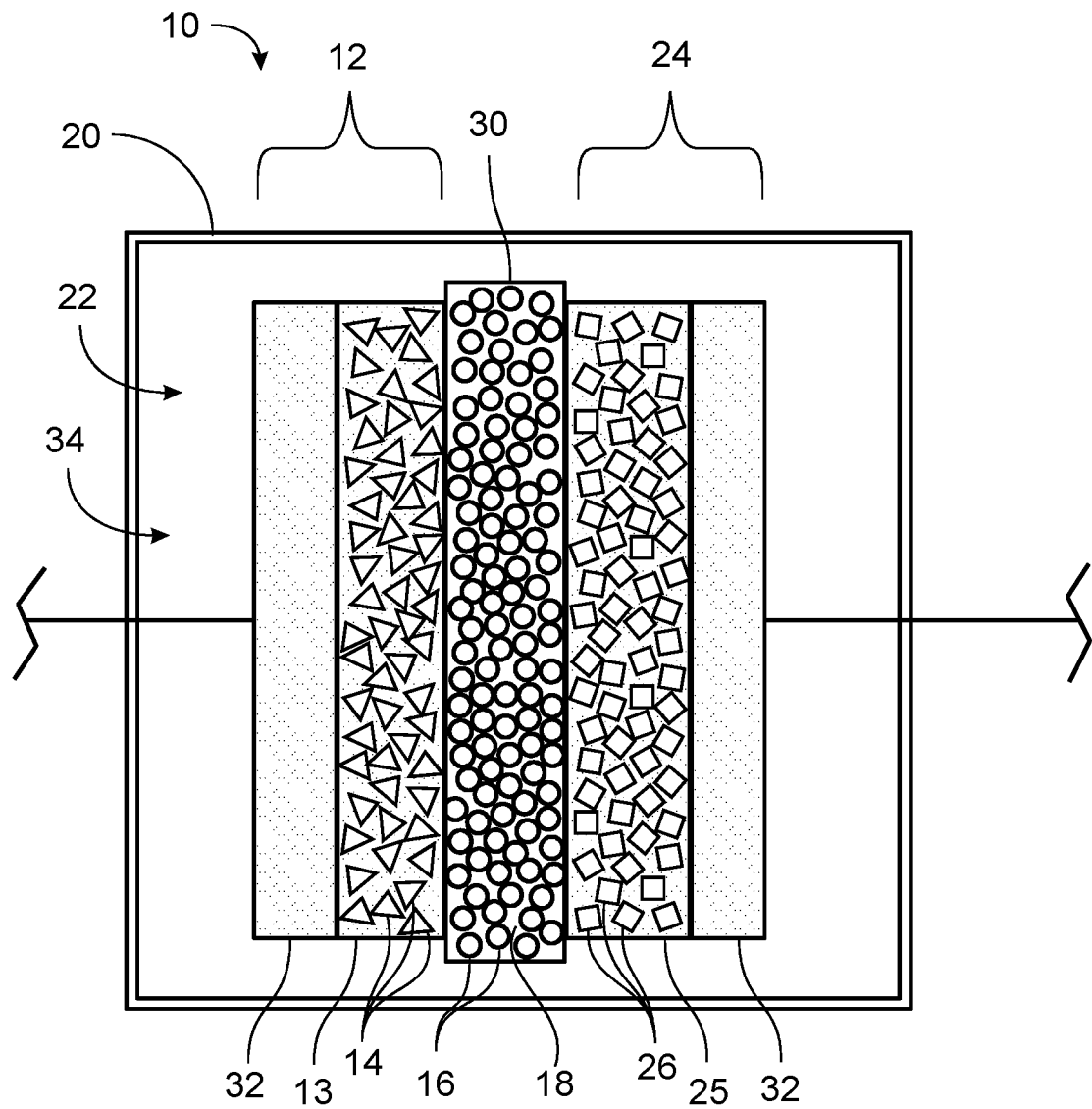
FIG. 1 is a schematic view of an illustrative electrochemical cell according to the present disclosure.

The present disclosure is directed to electrochemical cells that exhibit several advantageous properties, such as higher energy densities, higher power densities, longer cycle life, enhanced temperature performance, and reduced manufacturing cost, when compared to conventional electrochemical cells.

In the following description, numerous specific details may be set forth in order to provide a thorough understanding of the present technology. Particular exemplary embodiments of the present technology may be implemented without some or all of these specific details. In some instances, well-known process operations have not been described in detail so not to unnecessarily obscure the present technologies.

Various techniques and mechanisms of the present technology will sometimes be described in singular form for clarity. However, it should be noted that some embodiments include multiple iterations of a technique or multiple instantiations of a mechanism unless noted otherwise.

The following definitions apply herein, unless otherwise indicated.

"Electrode active material" refers to the portion or component of an electrode that participates in reactions by transporting ions through an electrolyte and/or electrons through an external circuit.

"Redox reaction" refers to a type of chemical reaction in which the oxidation states of atoms, molecules, radicals, or ions are changed by gaining or losing electrons. Redox reactions are characterized by the actual or formal transfer of electrons between chemical species, most often with one species undergoing oxidation while another species undergoes reduction.

"Current collector" refers to the component adjacent to an electrode configured to convey current from a fixed to a moving portion of the circuit of the electrochemical cell, or vice versa.

"Electrolyte" refers to a material that provides for ion transport within an electrochemical cell. An electrolyte acts as a conduit for ion transport through its interaction with an electrode.

A "full lifecycle of the electrochemical cell" is intended to mean that the life of the electrochemical cell is considered to have exceeded its normal useful life, which is assumed here to be the point at which the cell shows 80% of its original capacity for the first time.

"Coulombic efficiency" (also called faradaic efficiency or current efficiency) refers to the charge efficiency by which electrons are transferred in batteries. Coulombic efficiency is the ratio of the total charge extracted from the battery to the total charge put into the battery over a full charge discharge cycle.

"Greenhouse gas" refers to any of a large number of gases that are capable of absorbing and emitting radiant energy within the thermal infrared range, which, if present in a planetary atmosphere, can contribute to overall warming of the planet by trapping thermal radiation.

"Room temperature" refers to a temperature in the range from 15° C. and 25° C.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Unless they relate to specific examples, all specifications regarding quantities and portions, particularly those for delimiting the invention, indicate a ±10% tolerance, for example: 11% means: from 9.9% to 12.1%. For terms such as "a solvent", the word "a" is not to be regarded as a numerical word but as an indefinite article or as a pronoun, unless the context indicates otherwise.

The term: "combination" or "combinations" means, unless otherwise stated, all types of combinations, starting from two of the relevant constituents, to a plurality or all of such constituents, the term "containing" also means "consisting of".

Electrochemical Cell

The present disclosure is directed to electrochemical cells, as depicted semi-schematically in FIG. 1. Electrochemical cell 10 includes an electrode 12 that includes an electrode active material layer 13 comprising active material 14, an electrolyte 16 that includes an electrolytic solvent 18, and a housing 20 that encloses electrode 12 and electrolyte 16 under a gaseous atmosphere 22 that includes at least one greenhouse gas 34. Electrochemical cell 10 is constructed so that electrolyte 16 is in contact with electrode 12, and electrode active material 14 and electrolytic solvent 18 are selected so that electrode active material 14 has a solubility of at least 0.01 M in electrolytic solvent 18.

Electrochemical cell 10 optionally further includes an additional electrode 24, that includes an electrode active material layer 25 comprising active material 26. Where electrochemical cell 10 includes both electrode 12 and additional electrode 24, typically one of electrode 12 and additional electrode 24 may be a negative electrode and function as an anode, while the other of electrode 12 and additional electrode 24 may be a positive electrode and function as a cathode. The electrode 12 and additional electrode 24 are typically separated by an electrolytic separator 30. Either electrode 12 or additional electrode 24, or both, of electrochemical cell 10 may include a current collector 32 that is in electrical contact with that electrode. Electrochemical cell 10 may be formed as a button cell, a pouch cell, a prismatic cell, a cylindrical cell, a flow cell, as alternating plates, or in jelly rolls.

It should be appreciated that while the descriptions of various embodiments in the disclosure are written in terms of describing a single electrochemical cell, similar principles may be applied to an assembly that includes more than one electrochemical cell (such as, for example, electrochemical cell packs, and the like). Such multiple-cell assemblies should be understood to fall within the scope of the present disclosure.

Electrodes

Electrode 12 and, when present, additional electrode 24 of electrochemical cell 10 may have any suitable configuration and/or composition, provided that the electrode active material for each electrode exhibits a solubility in the electrolytic solvent of at least 0.01 M, preferably at least 0.1 M, and more preferably a solubility of at least 1 M.

Figure 2:
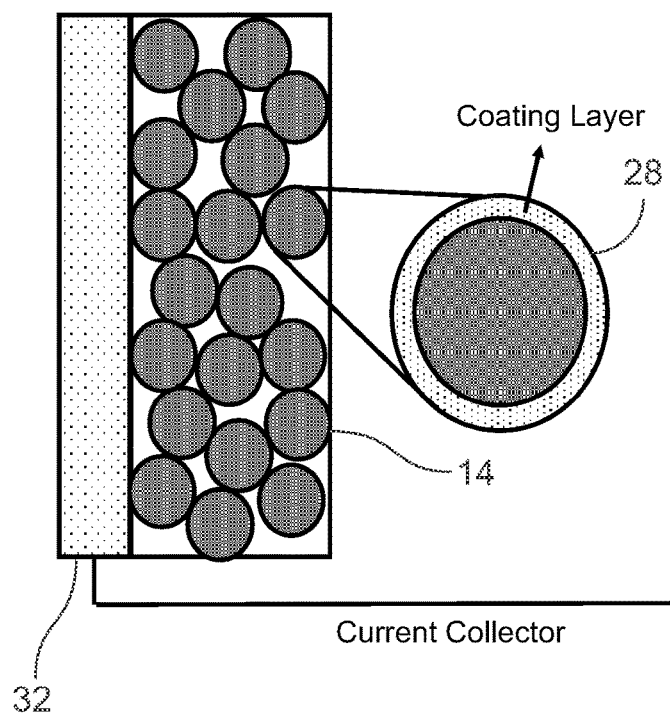
FIG. 2 is a semi-schematic diagram of a particle-type electrode and a planar-type electrode, showing the electrode active material as well as the electrode coating layer.
Figure 2:
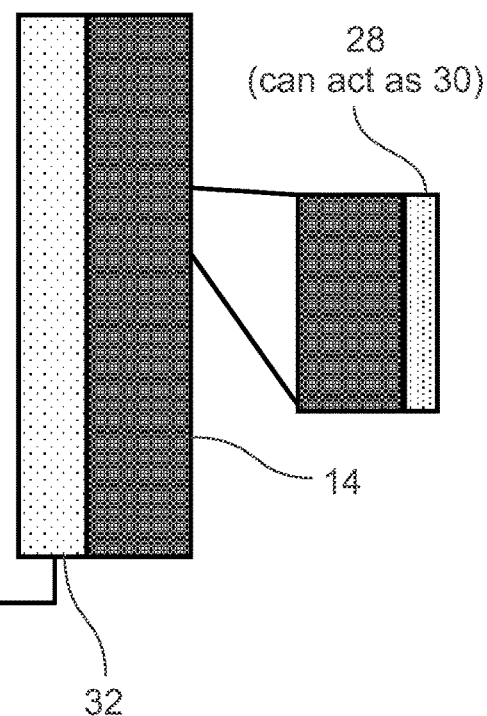

FIG. 2 is a semi-schematic view of exemplary electrodes that include electrode active materials. Either electrode, or both, may include a current collector 32 that is in electrical contact with that electrode.

The electrodes of the disclosed electrochemical cell typically include an electrically-conductive material as a substrate, or an electrode body, upon or in which electrode active material 14 is deposited or formed. Any suitable electrically-conductive material may be used for the disclosed electrodes, which may have the same or different formulation. The electrode active material and/or electrically-conductive material may be shaped into a planar surface, and/or be a particulate solid. Where the electrode active material and/or electrically-conductive material is particulate, the particles may have any suitable shape, including spherical, cubic, cuboid, conic, pyramidal, cylindrical, rectangular prismatic, hexagonal prismatic, hemispherical, triangular prismatic, pentagonal prismatic, octagonal prismatic, toroidal, octahedral, and dodecahedral, among others.

Alternatively, or in addition, the electrodes of the present disclosure may further include one or more of an electrically-conductive material, a carboxylic acid, a polymeric binder, and a plasticizer.

Where the electrodes of the present disclosure include a carboxylic acid, the carboxylic acid may be present to facilitate ion transport in and out of an electrode active material of the electrode. When present, the carboxylic acid can be a monocarboxylic acid or a polycarboxylic acid. When the carboxylic acid is a polycarboxylic acid, it may be oxalic acid.

Where the electrodes of the present disclosure include a polymeric binder, the polymeric binder may be present to help form a solid electrode from an electrode active material. An appropriate polymeric binder for the purposes of this disclosure may include one or more of polycaprolactone, poly(acrylic acid), poly(methyl methacrylate), polytetrafluoroethylene, poly(vinylidene fluoride), polyacrylonitrile, poly(ethylene terephthalate), polyvinylpyrrolidone, poly(4-vinylpyridine), polyvinyl chloride, polyvinyl alcohol, polyvinyl acetate, polyethylene, polypropylene, polylactic acid, polyvinyl butyral, polystyrene, polyurethane, polycarbonate, among others. In a particular embodiment, the polymeric binder includes one or poly(ethylene oxide) (PEO) or poly(vinylidene fluoride).

Where the electrodes of the present disclosure include a plasticizer, the plasticizer may be present to make the electrode material softer and more flexible, i.e. to increase its plasticity. When present, the plasticizer may include succinonitrile, glutaronitrile, adiponitrile, ethylene carbonate, propylene carbonate, dimethylformamide, dimethyl sulfoxide, γ-butyrolactone, sulfolane, 3-methyl-2-oxazolidinone, butylene carbonate, phthalate derivatives, trimellitates, adipates, sebacates, maleates, among others, and combinations thereof. In one embodiment, plasticizer may include succinonitrile.

In one embodiment, the electrodes of the present disclosure include an electrically-conductive material that has been doped with one or more heteroatoms. For example, the electrodes may include an electrically-conductive material that has been doped with one or more heteroatoms selected from boron, nitrogen, sulfur, phosphorous, fluorine, chlorine, and bromine heteroatoms.

In another embodiment, the electrodes of the present disclosure include an electrically-conductive material that is a porous inorganic carbon material (also referred to as a porous elemental carbon material). Such porous inorganic carbon materials may include one or more of carbon black, carbon nanotubes, carbon nanofibers, carbon dots, activated carbon, graphite, graphene, graphene oxide, and graphene nanoribbons, among others.

The electrically-conductive material may have an average particle size or diameter of about 5 nm to about 50 μm. Typically, the average particle size or diameter of the electrically-conductive material is less than about 50 μm. Preferably, the average particle size of the electrically-conductive material is greater than about 50 nm and less than about 40 μm. More preferably, the average particle size of the electrically-conductive material is greater than about 500 nm and less than about 30 μm.

The electrically-conductive material may have an average pore size of less than about 1 μm. For example, the electrically-conductive material may have an average pore size of about 0.1 nm to about 1 μm. Preferably, the average pore size of the electrically-conductive material is greater than about 1 nm and less than about 500 nm. More preferably, the average pore size of the electrically-conductive material is greater than about 5 nm and less than about 200 nm.

Electrode Active Material

Electrode 12 and additional electrode 24, when present, typically include one or more electrode active materials 14, which may be the same or different. Electrode active material 14 is typically involved in one or more of the redox reactions occurring within electrochemical cell 10, thereby gaining or losing electrons in the course of the reactions. Electrode active material 14 may constitute the entirety of an associated electrode, but is typically a component of or a coating on the electrode. Electrode active material 14 may be generated in situ by selection of the components of electrochemical cell 10, such as electrolyte 16 and additional components thereof, optionally followed by the application of a current to the electrochemical cell.

Electrode active material 14 can be a starting material, a discharge product, or a charge product. For example, in an electrochemical cell where graphite is used as a negative electrode active material, the graphite ($C_6$) can be lithiated during charge, forming $LiC_6$. Then, during discharge, $LiC_6$ may be delithiated and be converted back to $C_6$. In this example, both $C_6$ and $LiC_6$ are considered an electrode active material. The starting material, the discharge product and the charge product can all be different from one another.

Electrode active material 14 may include one or more metals, or a mixture of metals, present as a metallic solid or metal alloy. Where electrode active material 14 includes a metal or metal complex, the metal may include one or more of lithium, sodium, potassium, beryllium, magnesium, calcium, vanadium, iron, nickel, copper, zinc, and aluminum, or ions thereof. In one embodiment, electrode active material 14 includes a metal or metal complex that includes lithium. Where electrode active material 14 includes one or more metal complexes, the metal complex may be, for example, a metal complex of a halogen, or a metal complex of an organic compound.

Electrode active material 14 may include one or forms of oxygen and/or sulfur, such as for example oxide or sulfide compositions. Alternatively, or in addition, electrode active material 14 may include one or more halogens, or halogen compositions, such as halide compounds. Where electrode active material 14 includes halogens, the halogen may be one or both of chlorine and bromine.

In one embodiment, electrode active material 14 includes lithium, chlorine, and bromine.

In some embodiments, electrode active material 14 may include inorganic carbon materials, as discussed above. Alternatively, or in addition, electrode active material 14 may include one or more organic compounds. In one aspect, electrode active material 14 includes an organic compound that includes a heteroatom, such as nitrogen or oxygen, among others. Alternatively or in addition, electrode active material 14 includes an organic compound that includes one or more aromatic groups. For example, electrode active material 14 may include one or more organic compounds such as truxenone, truxenone derivatives, phenoxazine, phenoxazine derivatives, phenothiazine, phenothiazine derivatives, quinone, quinone derivatives, diamine derivatives, phenazine, phenazine derivatives, quinoxaline, quinoxaline derivatives, pyrazine, pyrazine derivatives, cyclohexane, cyclohexane derivatives, triazine, triazine derivatives, melamine, melamine derivatives, dimethoxybenzene, dimethoxybenzene derivatives, cyclopropenium derivatives, amide derivatives, or any combination thereof, among others.

Electrode active material 14 may include one or more organic moieties, where an organic moiety is a fragment or substituent of a larger compound. Where electrode active material 14 includes an organic moiety, it may be derived from an organic compound, as described above. Examples of organic moieties include alkyl groups, alkenyl groups, alkynyl groups, acyl groups, alkylamino groups, and aryl groups, among others.

Electrode active material 14 may be present as a composition of solid particles. The average particle size of an appropriate electrode active material may vary from about 5 nm to about 50 μm, and may exhibit an average pore size of about 0.1 nm to about 1 μm. Preferably, the average particle size of an electrode active material is greater than about 500 nm and less than about 50 μm. More preferably, the average particle size of an electrode active material is greater than about 1 µm and less than about 30 µm.

Where electrode active material 14 is present as a composition of solid particles, the average pore size of the electrode active material may be less than about 1 µm. Preferably, the average pore size of an electrode active material is greater than about 1 nm and less than about 500 nm. More preferably, the average pore size of an electrode active material is greater than about 5 nm and less than about 200 nm.

In some embodiments, electrode active material 14 is at least partially enclosed by a coating 28. This coating 28 may be generated chemically and/or electrochemically from the greenhouse gas within electrochemical cell housing 20. The presence of coating 28 may be beneficial in lowering the cell resistance of electrochemical cell 10, and/or protecting electrode active material 14 from another electrode active material. In one embodiment, coating 28 may also function as separator 30 by separating a positive electrode material from a negative electrode material.

When present, the coating may form a layer at an outer surface of the electrode active material, and may vary in thickness from about 1 nm to about 1 µm in thickness. Preferably, the thickness of the coating layer is about 2 nm to about 500 nm. More preferably, the thickness of the coating layer is about 5 nm to about 200 nm. When present, the coating layer may include oxygen or sulfur.

Electrode active material 14 may incorporate or be in contact with an electrically-conductive material of the electrode. In particular, electrode active material 14 may include a porous inorganic carbon material that includes one or more of carbon black, carbon nanotubes, carbon nanofibers, carbon dots, activated carbon, graphite, graphene, graphene oxide, and graphene nanoribbons, among others.

The average particle size or diameter of the particles making up electrode active material 14 and the particles of the electrically-conductive material of the electrode may be inversely correlated. For example, where the average particle size of electrode active material 14 is in the range of about 10 µm to about 50 µm, that of the electrically conductive material can be about 10 nm to about 500 nm, or vice versa. Typically, one or more of the electrode active materials and the electrically-conductive materials include particles with an average particle size or diameter of greater than about 50 nm and less than about 50 µm, preferably greater than about 500 nm and less than about 40 µm, more preferably greater than about 1 µm and less than about 30 µm.

Current Collectors

Either electrode 12 or additional electrode 24, or both, of electrochemical cell 10 may include a current collector 32 that is in electrical contact with that electrode. At least a portion of the electrically-conductive material of each electrode is in contact with current collector for that electrode. Each current collector 32, which may be the same or different, can include any suitable and compatible conductive material.

For example, current collector 32 may include one or more metals such as alkaline earth metals, transition metals, rare earth metals, post-transition metals, and alkali metals, or any combination thereof. In particular, current collector 32 may include a metal, metal alloy, or metal compound that includes aluminum, copper, silver, nickel, iron, chromium, or a combination thereof. In one embodiment, current collector 32 is or includes duplex steel or stainless steel. Alternatively, or in addition, current collector 32 is a metallic current collector that may include one or more of molybdenum, titanium, and zirconium metals or metal alloys.

Alternatively, or in addition, current collector 32 can include porous inorganic carbon. In particular, current collector 32 can include a freestanding carbon material in the form of a paper, a foam, a felt, a fiber, a film, a sheet, a tape, a cloth, a disc, a string, a foil, or any combinations thereof.

The current collector can be solid or perforated. When perforated, the pore size of the current collector can vary from about 500 nm to about 1 mm, with a separation distance between pores of about 10 µm to about 100 mm.

The electrically-conductive material of the electrode, with additional conductive materials, polymeric binder, and plasticizers, if present, can be applied to a current collector using any suitable application technique. For example, the electrically-conductive material can be cast into a film and then deposited onto the desired current collector.

Current collector 32 may be in contact with an electrically-conductive material, for example by being coated with the electrically-conductive material. In this embodiment, the electrically conductive material may be a porous inorganic carbon material that is carbon black, carbon nanotubes, carbon nanofibers, carbon dots, activated carbon, amorphous carbon, microporous carbon, mesoporous carbon, porous carbon, graphite, graphene, graphene oxide, graphene nanoribbons, nitrogen-doped carbon, nitrogen-doped graphene, nitrogen-doped graphene oxide, and mixtures and combinations thereof. In some embodiments, the electrically-conductive material is in the form of particles, powders, rods, or any combination thereof.

In some embodiments, electrochemical cell 10 includes an additional current collector 32, but does not include additional electrode 24. In such a case the additional current collector can be disposed on electrolyte 16 such that electrolyte 16 is disposed between electrode 12 and additional current collector 32. In some embodiments, additional current collector 32 corresponds to housing 20 of electrochemical cell 10.

Separator

Electrochemical cell 10 may include a separator 30. Separator 30 may be in contact with the electrode, or separator 30 may be in contact with electrolyte 16. Where electrochemical cell 10 includes additional electrode 24, separator 30 may be disposed between electrode 12 and additional electrode 24.

Separator 30 may be larger in one or both of its width and length than current collectors 32, in order to avoid contact between the electrode and the additional electrode, contact between the current collectors, contact between a positive electrode and a negative current collector, or contact between the negative electrode and the positive current collector.

Separator 30 may include an electrolyte 16 to provide for ion transport within electrochemical cell 10, and to act as a conduit for ion transport through its interaction with the electrode 12 and additional electrode 24. Electrolytic separator 30 may be in contact with the electrolyte, and may include a polymer material, such as for example a polymer film such as polyethylene, polypropylene, poly(tetrafluoroethylene), or poly(vinyl chloride), among others. Typically, the polymer film, when present, includes polypropylene and/or polyethylene. Alternatively, or in addition, electrolytic separator 30 can include, nonwoven fibers (such as nylon, polyesters, and glass, among others), a glass, a ceramic, or any combination thereof. In some embodiments, the separator includes glass fibers. In some embodiments, the separator includes a surfactant coating or treatment to enhance the wettability of a liquid-based electrolyte.

In some embodiments, additional electrode active material 26 of additional electrode 24 includes coating 28 that coats an outer surface of additional electrode active material 26, where the coating layer includes oxygen or sulfur. This coating layer may act as a separator that is a solid-state electrolyte. In this embodiment, the coating layer is electrically-insulating, ionically-conductive, and substantially separates the electrode active material from the additional electrode active material.

Electrolyte

Electrochemical cell 10 may include electrolyte 16. Electrolyte 16 may include a solid electrolyte, a liquid electrolyte, a gel electrolyte, a liquefied gaseous electrolyte, or any combination thereof. The electrolyte may be present in contact with electrode active material 14. Electrolyte 16 may be in contact with electrode active material 14, for example by being located within electrode 12 (for example, disposed between the particles of electrode active material 14).

Electrolyte 16 may be a solid electrolyte. Solid-state electrolytes may be electrically-insulating and ionically-conductive. In some embodiments, the solid-state electrolyte can include one or more polymers, glasses, phosphates, fluorophosphates, carbonates, amines, borates, fluoroborates, halides, halates, oxohalides, oxides, perovskites, antiperovskites, garnets, sulfides, LISICON-types, thio-LISICON types, oxynitrides, and nitrides, among others (LISICON is an acronym for Lithium Super Ionic CONductor).

Where electrolyte 16 is a solid electrolyte, it may include sulfur. For example, electrolyte 16 may include one or more of $Li_6PS_5Cl$, $Li_{9.54}Si_{1.74}P_{1.44}S_{11.7}Cl_{0.3}$, $Li_{10}GeP_2S_{12}$, $Li_7PS_6$, $Li_7P_3S_{11}$, $Li_{3.25}P_{0.95}S_4$, $Li_{(3+x)}Ge_xP_{(1-x)}S_4$, $Li_{(4-x)}Ge_{(1-x)}P_xS_4$.

Where electrolyte 16 is a solid electrolyte, it may include oxygen. For example, electrolyte 16 may include one or more of $SiO_2$, $TiO_2$, $Al_2O_3$, $Y_2O_3$, $Mg_2B_2O_5$, $Li_2O$, $Li_2O_2$, $Li_2CO_3$, $LiOH$, $P_2O_5$, $GeO_2$, $AlPO_4$, $Li_2Ti_3O_7$, $Li_3OBr$, $Li_3OCl$, $Li_2OHBr$, $Li_2OHCl$, $Li_{(1+x)}Al_xTi_{(2-x)}(PO_4)_3$, $Li_{(2+2x)}Zn_{(1-x)}GeO_4$, $Li_{(3+x)}Ge_xV_{(1-x)}O_4$, $Li_{(4-x)}Si_{(1-x)}P_xO_4$, $Li_{(1+x+y)}Al_xTi_{(2-x)}Si_yP_{(3-y)}O_{12}$, $Li_{(1+x)}Al_xGeTi_{(2-x-y)}P_3O_{12}$, $Li_{(1+x+3y)}Al_x(Ge,Ti)_{(2-x)}(Si_yPO_4)_3$, $Li_{14}ZnGe_4O_{16}$, $Li_{(4-x)}V_xGe_xO_4$, $Li_7La_3Zr_2O_{12}$, $Li_{(7-x)}La_3Zr_{(2-x)}Nb_xO_{12}$, $Li_7La_{(3-x)}Ca_xZr_{(2-x)}Nb_xO_{12}$, $Li_{(6+x)}La_3Zr_{(1+x)}Ta_{(1-x)}O_{12}$.

Electrolyte 16 may include an electrolytic solvent 18. Electrolytic solvent 18 may include water and/or another solvent, such as for example a nitrogenous organic compound. Examples of nitrogenous organic compounds can include amide-substituted organic compounds. Appropriate electrolytic solvents can include dimethylacetamide, acetonitrile, dimethylsulfoxide, dimethylformamide, and dimethylamine, among others. preferably, the electrolytic solvent is or includes dimethylacetamide.

For every electrolytic solvent 18, the solvent and electrode active materials 14 and 26 are selected so that the electrode active materials have a solubility of at least 0.01 M in the electrolytic solvent.

Electrolyte 16 may include one or more additional solvents, or one or more additional solutes. Electrode active materials 14 and 26 may have a solubility of less than 0.01 M in the additional solvents or solutes. Preferably, electrode active materials 14 and 26 have a solubility greater than zero and less than 0.01 M in the additional solvents or solutes.

Additionally, electrolyte 16 may include a plasticizer.

Electrolyte 16 may be larger in one or both of its width and length than current collectors 32, in order to avoid contact between the electrode and the additional electrode, contact between the current collectors, contact between a positive electrode and a negative current collector, or contact between the negative electrode and the positive current collector.

Electrochemical Cell Atmosphere

Electrochemical cell 10 typically encloses a gaseous atmosphere that includes at least one greenhouse gas within the electrochemical cell. Additionally, the gaseous atmosphere of electrochemical cell 10 may include one or more inert gases.

Greenhouse Gas

Electrolyte 16 and/or electrode 12 may be in contact with a greenhouse gas 34 within gaseous atmosphere 22 within electrochemical cell 10. In some embodiments, greenhouse gas 34 includes one or more perfluorocarbons, one or more chlorofluorocarbons, one or more hydrofluorocarbons, or any combination thereof. In other embodiments, greenhouse gas 34 can include one or more of carbon dioxide ($CO_2$), carbon monoxide (CO), ozone ($O_3$), methane ($CH_4$), tetrafluoromethane ($CF_4$), hexafluoroethane ($C_2F_6$), sulfur hexafluoride ($SF_6$), carbon tetrachloride ($CCl_4$), nitrous oxide ($N_2O$), nitrogen dioxide ($NO_2$), sulfur dioxide ($SO_2$), carbon disulfide ($CS_2$), and carbonyl sulfide (COS), among others.

During operation of electrochemical cell 10, greenhouse gas 34 may be consumed or dissolved at a rate of less than 1 mg per 1 mAh, preferably at a rate less than 0.1 mg per 1 mAh, more preferably at a rate less than 0.01 mg per 1 mAh, on average, during a full lifecycle of the electrochemical cell. As used herein, the term "full lifecycle of the electrochemical cell" is intended to mean that the life of the cell is considered to have exceeded its normal useful life, which is assumed here to be the point at which the cell shows 80% of its original capacity for the first time.

Alternatively, greenhouse gas 34 may be present within electrochemical cell 10, but is not intended to be used as an active material.

Greenhouse gas 34 may be added to electrochemical cell 10 by fabricating the electrochemical cell under a greenhouse gas atmosphere. Alternatively, the desired greenhouse gas may be introduced into electrochemical cell 10 before use, typically by purging the original gases from the electrochemical cell and replacing it with the desired greenhouse gas.

Greenhouse gas 34 may be dissolved in electrolyte 16, particularly where electrolyte 16 is a liquid electrolyte. Greenhouse gas 34 may be added to electrolyte 16 via a chemically resistant frit or foam submerged in the liquid electrolyte. The liquid electrolyte may be kept under the greenhouse gas at a pressure above a standard atmospheric pressure for a time sufficient for the greenhouse gas to be dissolved in the liquid electrolyte. The liquid electrolyte may be kept under the greenhouse gas for at least 10 seconds, preferably at least 30 seconds, and more preferably at least 60 seconds. In some embodiments, the liquid electrolyte is kept under the desired greenhouse gas at a pressure of at least 1 bar, preferably at least 5 bar, more preferably at least 10 bar or any range or value therein.

In some embodiments, greenhouse gas 34 may be added to the electrolyte at a pressure at which that greenhouse gas is liquefied. Where greenhouse gas 34 is a liquid, greenhouse gas 34 may be present in contact with electrolyte 16, and/or dissolved in electrolyte 16.

Electrochemical cell 10 may include a gaseous atmosphere that is a "greenhouse gas-rich atmosphere." For example, the greenhouse gas-rich atmosphere may include one or more greenhouse gases 34 at a total concentration of at least 10 vol. %, preferably at least 25 vol. %, more preferably at least 50 vol. %, or any range or value therein.

Alternatively, or in addition, the greenhouse gas-rich atmosphere may include one or more greenhouse gases 34 at a partial pressure of at least 0.1 atm, preferably at least 0.25 atm, and more preferably at least 0.5 atm, or any range or value therein.

Inert Gas

Electrochemical cell 10 may include an inert gas within the cell. Electrode 12 and/or electrolyte 16 may be in contact with the inert gas. The inert gas may be or include nitrogen, argon, helium, neon, argon, krypton, xenon, radon, or any combination thereof, among others.

Electrochemical cell 10 may be fabricated under an inert gas atmosphere, or the desired inert gas may be introduced into electrochemical cell 10 before use by purging the existing atmosphere from housing 20 of electrochemical cell 10 replacing it with the desired inert gas, after the cell is fabricated.

Methods of Manufacture

A discussion of exemplary and non-exclusive methods and processes for the manufacture of the electrochemical cells of the present disclosure are provided below.

In one example, a method of fabricating an electrochemical cell of the present disclosure includes forming a cell stack within a cell housing, where the cell stack includes an electrode that includes an electrode active material incorporated into or onto an electrically conductive material, and an electrolyte positioned in and on the electrode. The cell stack may be assembled so that the electrolyte is in contact with the electrode and the electrolyte will be in contact with the atmosphere within housing 20. In one embodiment, the step of forming the cell stack may be performed under a greenhouse gas-rich atmosphere.

The method may also include introducing greenhouse gas into the cell stack, and applying voltage or current to the electrochemical cell while under the greenhouse gas. The method may additionally include purging a forming gas from the cell housing using the greenhouse gas, where the forming gas was generated while applying voltage or current to the electrochemical. Alternatively, or in addition, a partial pressure of the greenhouse gas in the cell stack may be lowered by applying a vacuum to the electrochemical cell, or by purging the cell housing with an inert gas.

Persons of ordinary skill in the art will recognize that electrochemical cells prepared according to the present disclosure, and related fabrication methods, may include any combination of the above components.

Figure 3:
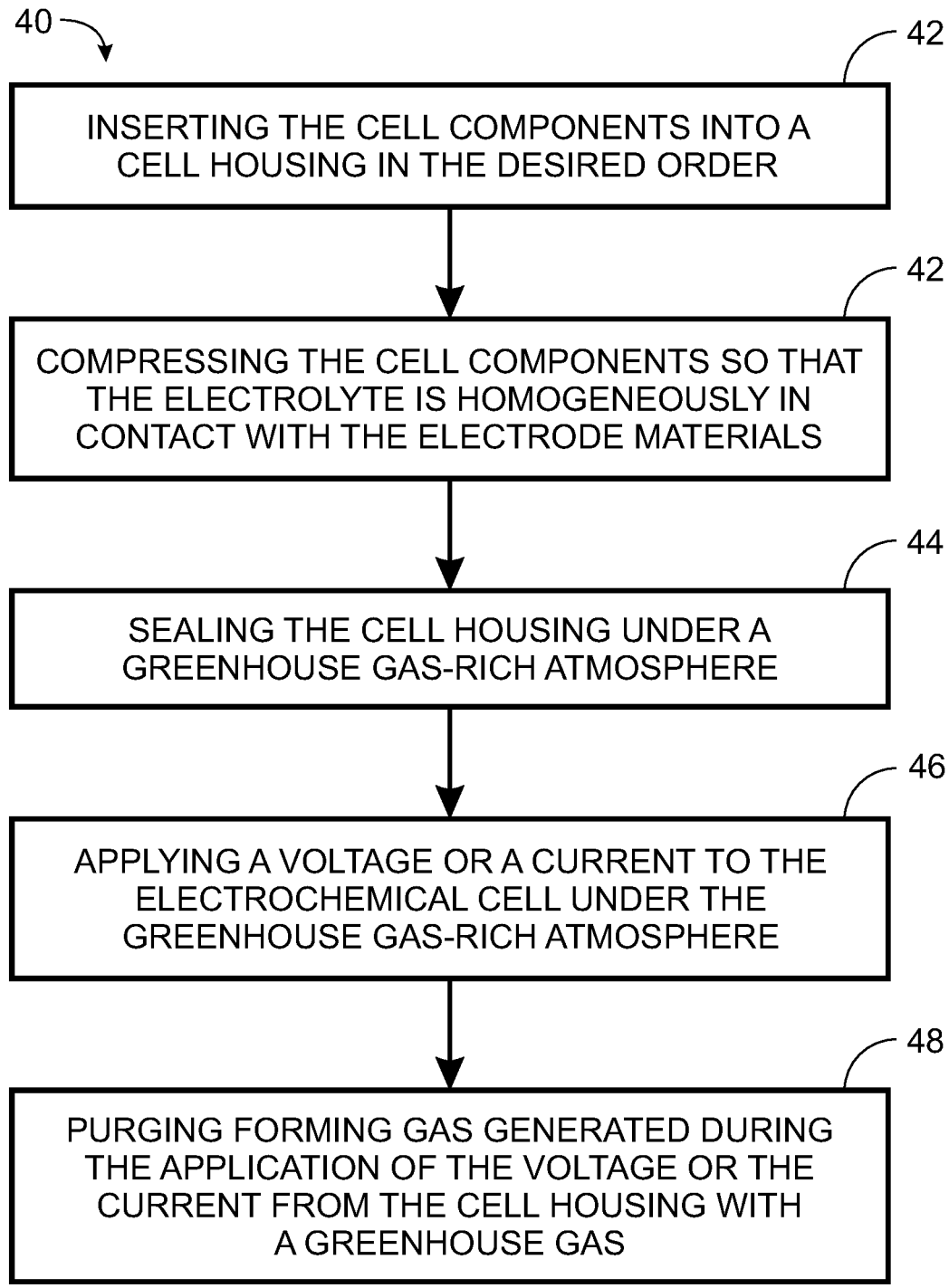
FIG. 3 is a flow chart of an illustrative method of fabricating an electrochemical cell according to the present disclosure.

FIG. 3 is a flow chart 40 of an exemplary method of fabricating an electrochemical cell according to the present disclosure. The method of flow chart 40 includes a) inserting the cell components into an exterior cell housing in the desired order, at step 42; b) compressing the cell components so that the electrolyte is homogeneously in contact with the electrode materials, at step 44; c) sealing the exterior cell housing under a greenhouse gas-rich atmosphere, at step 46; d) applying voltage or current to the electrochemical cell under the greenhouse gas-rich atmosphere, at step 48; and e) purging forming gas generated during the application of voltage or current from the exterior cell housing with a greenhouse gas, at step 50.

In one embodiment, inserting the cell components into the cell housing includes inserting the cell components in an order of i) a negative current collector, ii) a negative electrode, iii) an electrolyte (a separator), iv) a positive electrode, and v) a positive current collector. Alternatively, the order of cell components can be reversed.

The step of compressing the cell components should involve careful control of the pressure applied to the cell components, so that the electrode and the additional electrode remain clearly separated.

By incorporating a greenhouse gas-rich atmosphere within the cell housing, a protective coating layer can be formed on the surface of the electrode and/or the electrolyte materials due to a chemical and/or electrochemical reaction. Alternatively, or in addition, the presence of greenhouse gases can add electroactive functional groups to the surface of the electrode materials, and/or redesign the chemical structure of the electrode materials. Such a redesign of the electrode materials may contribute to the resulting electrochemical cell being capable of storing more energy per a unit mass, or per area of the electrode.

When applying voltage or current to the electrochemical cell, it may be preferable to apply a relatively low voltage or current.

Figure 4:
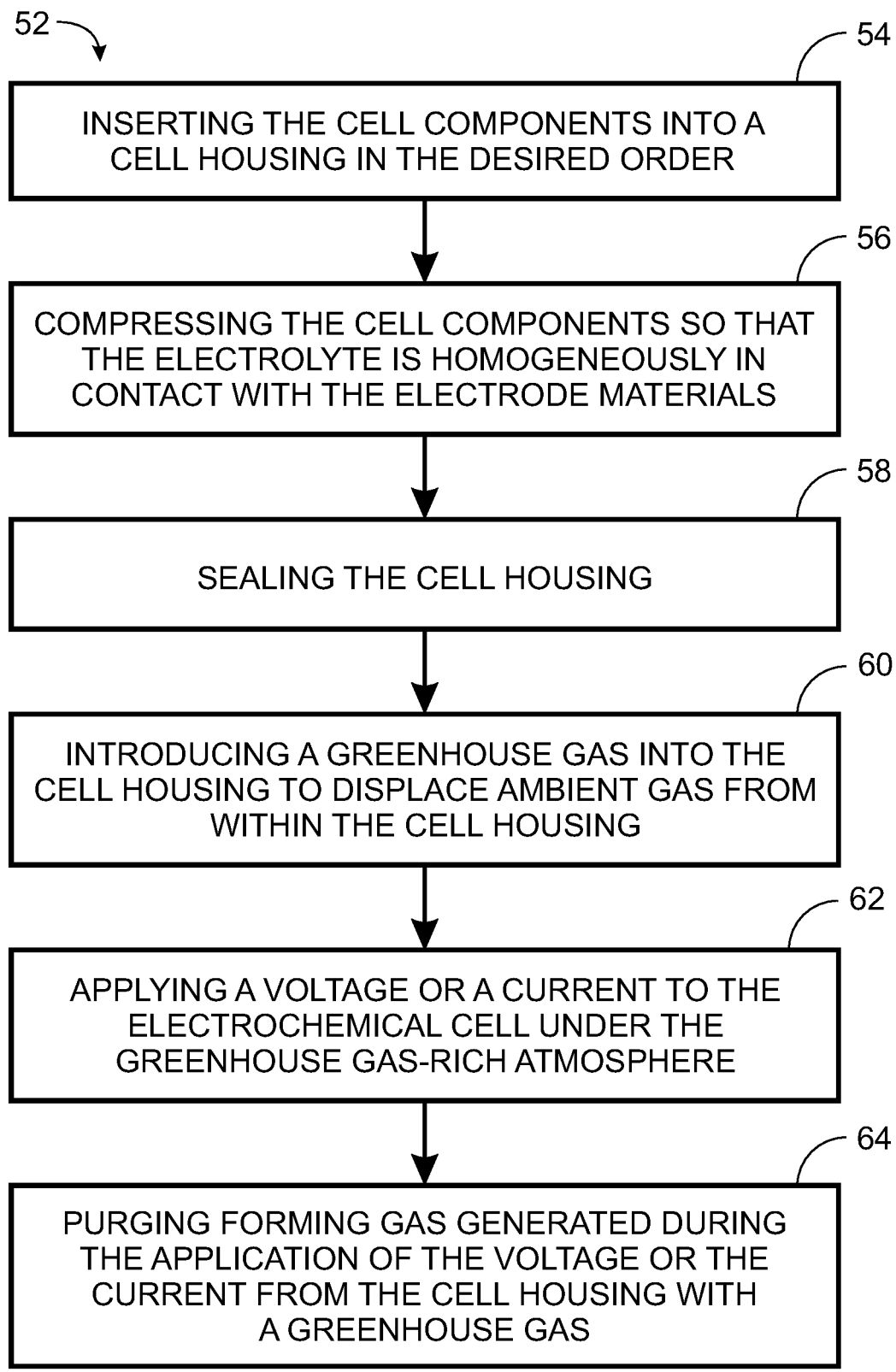
FIG. 4 is a flow chart of an alternative and illustrative method of fabricating an electrochemical cell according to the present disclosure.

FIG. 4 is a flow chart 52 of an alternative exemplary method of fabricating an electrochemical cell according to the present disclosure. The method of flow chart 52 includes a) inserting all the cell components into an exterior electrochemical cell housing in the desired order, at step 54; b) compressing the cell components so that the electrolyte is homogeneously in contact with the electrode materials, at step 56; c) sealing the exterior electrochemical cell housing, at step 58; d) introducing a greenhouse gas into the exterior electrochemical cell housing to displace ambient gas from within the exterior electrochemical cell housing, at step 60; e) applying a voltage or a current to the electrochemical cell under the greenhouse gas atmosphere at step 62; and f) purging from the exterior electrochemical cell housing any forming gas generated during the application of voltage or current with the greenhouse gas, at step 64.

Figure 5:
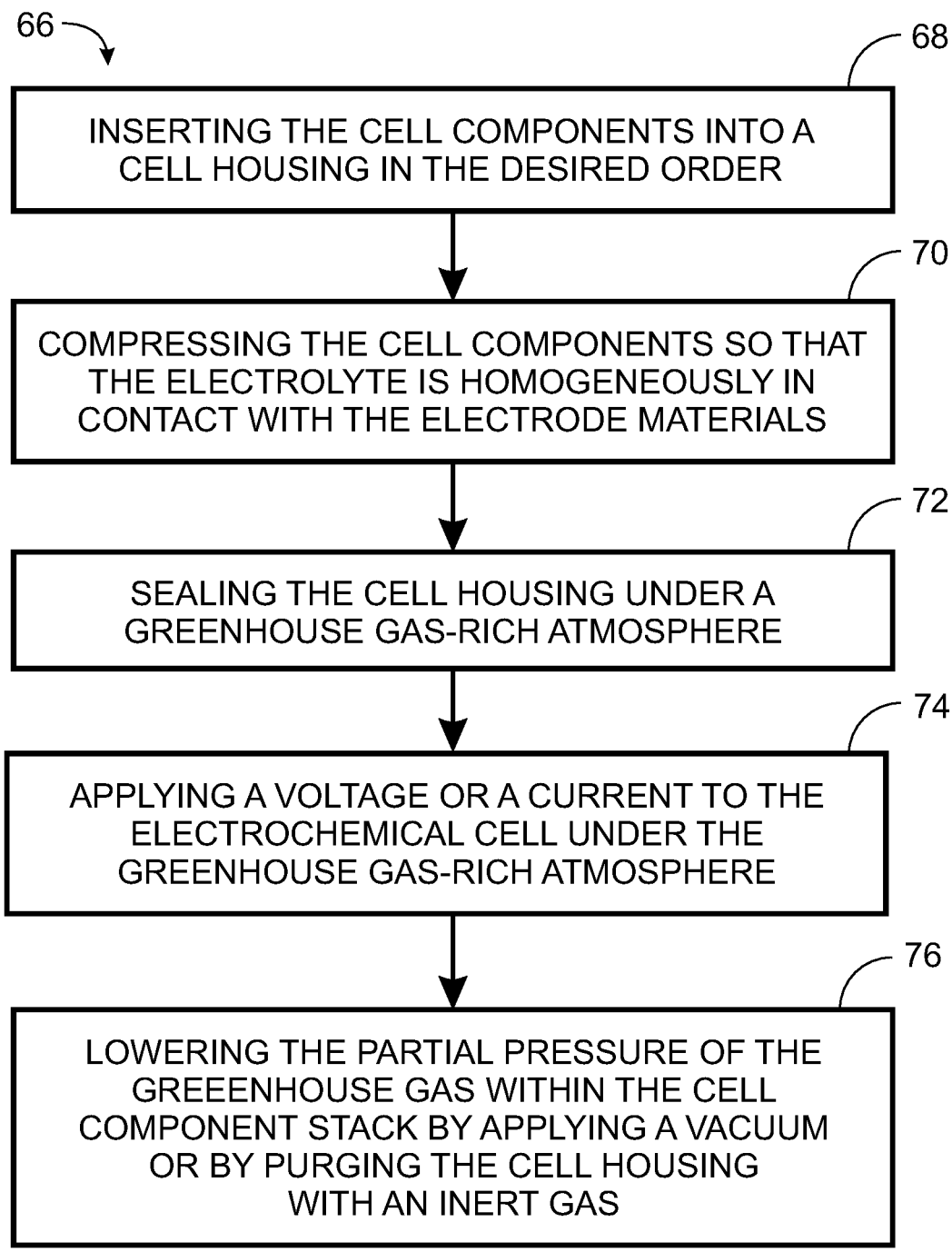
FIG. 5 is a flow chart of another alternative and illustrative method of fabricating an electrochemical cell according to the present disclosure.

FIG. 5 is a flow chart 66 of an alternative exemplary method of fabricating an electrochemical cell according to the present disclosure. The method of flow chart 66 includes inserting the cell components into an exterior electrochemical cell housing in the desired order, at step 68; b) compressing the cell components so that the electrolyte is homogeneously in contact with the electrode materials, at step 70; c) sealing the exterior electrochemical cell housing under a greenhouse gas-rich atmosphere, at step 72; d) applying a voltage or a current to the electrochemical cell under the greenhouse gas atmosphere, at step 74; and e) lowering the partial pressure of the greenhouse gas within the cell component stack by applying a vacuum or by purging the electrochemical cell housing with an inert gas, at step 76.

In the context of the method of flow chart 66, the partial pressure of the greenhouse gas within the cell component stack may be reduced to less than or equal to 0.9 atm, preferably to less than or equal to 0.5 atm, and more preferably to less than or equal to 0.1 atm.

Figure 6:
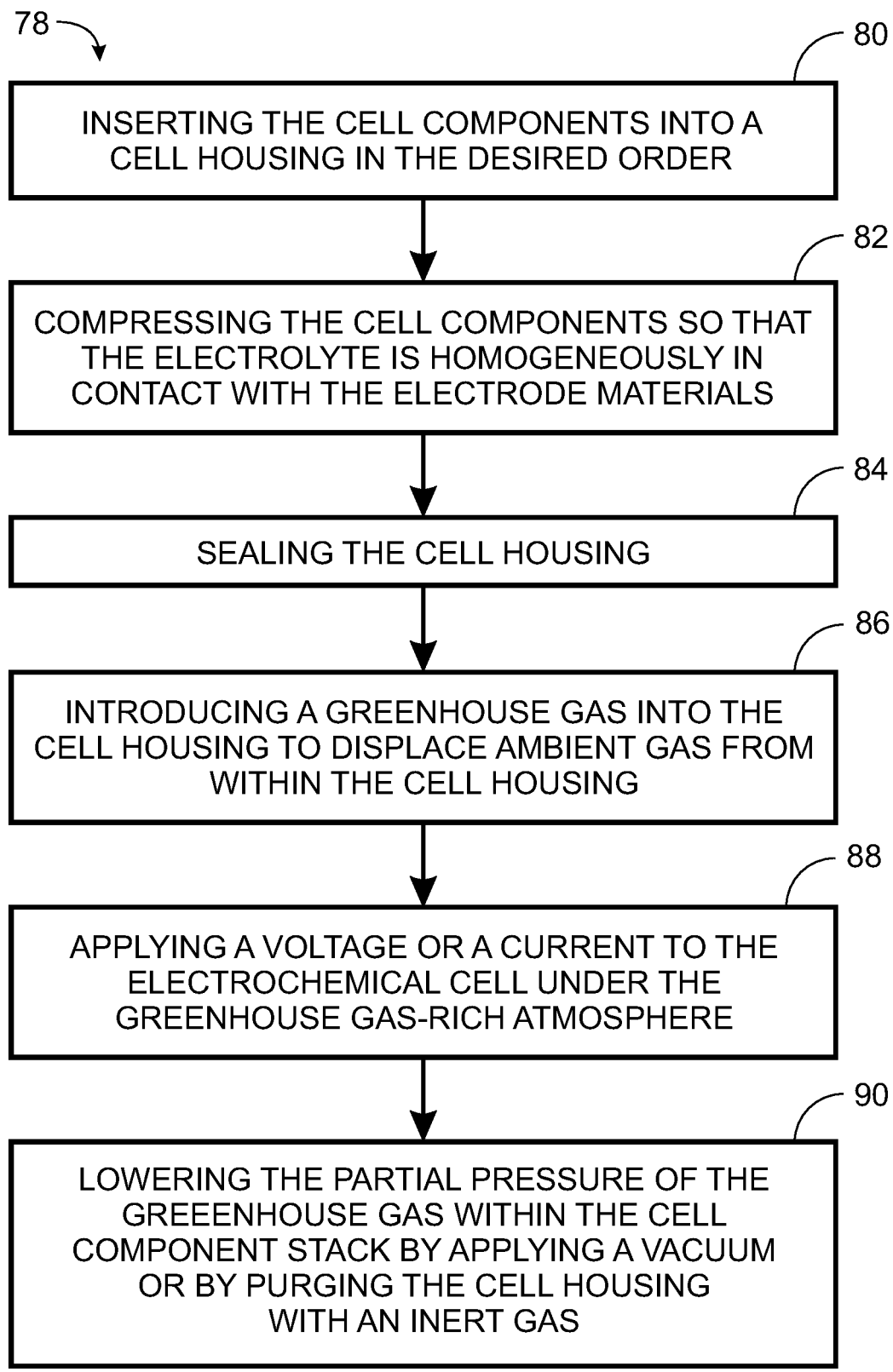
FIG. 6 is a flow chart of another alternative and illustrative method of fabricating an electrochemical cell according to the present disclosure.

FIG. 6 is a flow chart 78 of an alternative exemplary method of fabricating an electrochemical cell according to the present disclosure. The method of flow chart 78 includes a) inserting the cell components into an exterior electrochemical cell housing in the desired order, at step 80; compressing the cell components so that the electrolyte is homogeneously in contact with the electrode materials, at step 82; c) sealing the exterior electrochemical cell housing, at step 84; d) introducing a greenhouse gas to the exterior electrochemical cell housing in order to displace ambient gas from within the exterior electrochemical cell housing, at step 86; e) applying a voltage or a current to the exterior electrochemical cell housing under a greenhouse gas atmosphere, at step 88; and f) lowering a partial pressure of the greenhouse gas within the ordered cell components by applying a vacuum or by purging with an inert gas, at step 90.

In the context of the method of flow chart 78, the partial pressure of the greenhouse gas within the cell component stack may be reduced to less than or equal to 0.9 atm, preferably to less than or equal to 0.5 atm, and more preferably to less than or equal to 0.1 atm.

EXAMPLES

The following examples are provided so as to illustrate the preparing and use of the electrochemical cells of the present disclosure. They are not intended to limit or define the scope of the invention, which is set out in the appended claims.

Example 1. Preparation of an Illustrative Electrochemical Cell

The positive electrode is obtained by homogenously mixing anhydrous LiBr, LiCl, synthetic graphite powder, polytetrafluoroethylene, oxalic acid, succinonitrile and then compressing the resulting composite with a stainless-steel roller onto a 316L stainless steel mesh current collector. Components LiBr and LiCl are selected as the positive electrode active materials. The LiBr:LiCl molar ratio is 1:1, whereas the LiBr:LiCl:graphite mass ratio is about 2:1:2. The thickness of the positive electrode is about 100 μm. Synthetic graphite is selected as the negative electrode material, and therefore coated onto a 316L stainless steel mesh current collector. The 316L stainless steel mesh current collectors have a wire diameter of 0.05 mm and an aperture of 0.08 mm.

Aqueous electrolytes are prepared by dissolving lithium trifluoromethanesulfonate, polyvinyl alcohol and poly(ethylene oxide) in water and heating at 80° C. for 1 hour under carbon dioxide atmosphere at 5 bar above standard atmospheric pressure. The solubility of LiBr or LiCl is greater than 0.01 M in water at room temperature, the solubility of LiBr or LiCl is less than 0.1 M in the aqueous electrolyte solution at room temperature.

The electrochemical cell is assembled as a CR2032-type coin cell using the electrodes and electrolytes in an argon-filled glovebox (<0.1 ppm $O_2$, <0.1 ppm $H_2O$). After assembly of the electrochemical cell, carbon dioxide gas is introduced into the cell outside of the glovebox.

Figure 7:
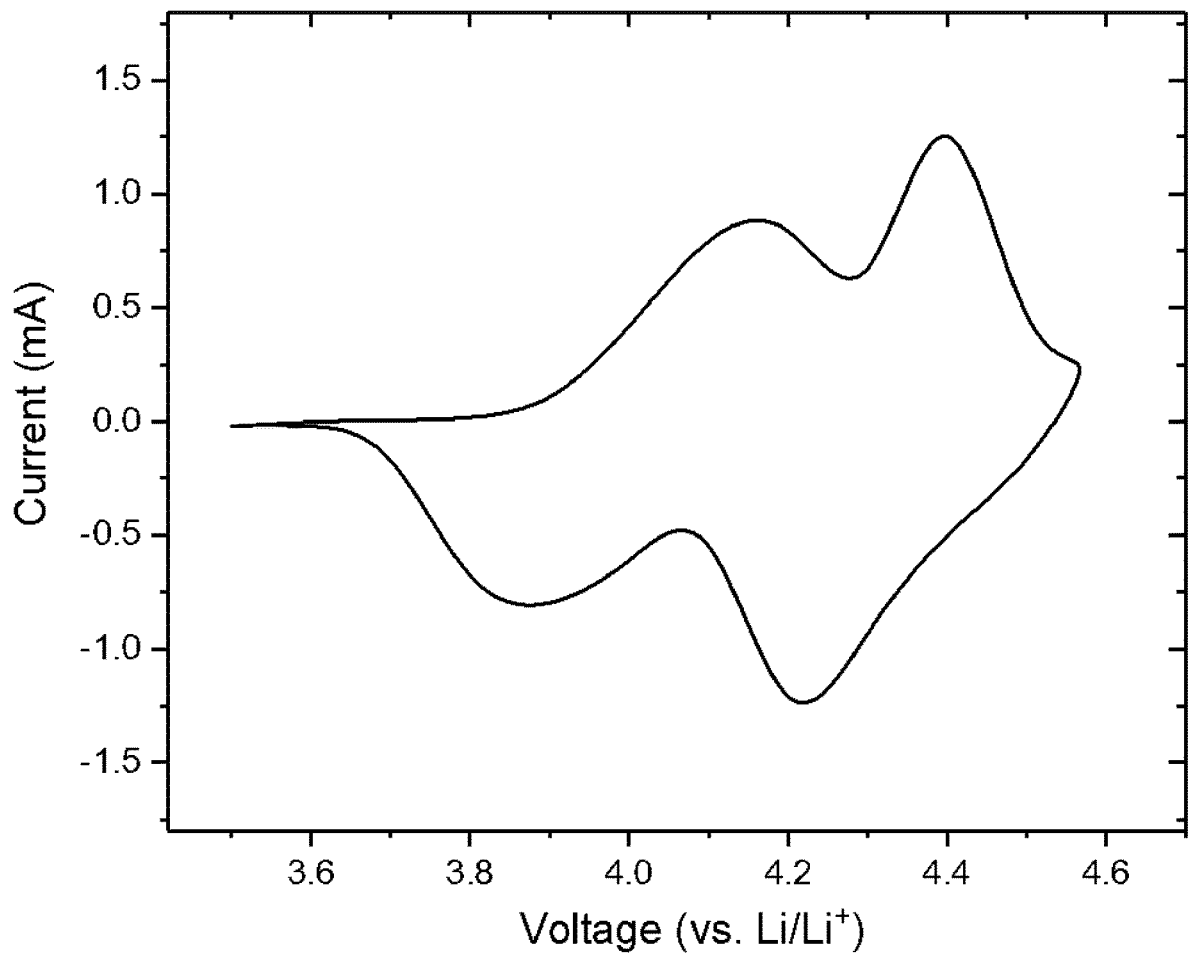
FIG. 7 is a cyclic voltammogram of an exemplary electrochemical cell according to the present disclosure.

FIG. 7 shows a cyclic voltammogram (CV) of an electrochemical cell prepared according to the above method. The electrode potential at peak currents represents two different redox reactions, $LiBr+C_n \leftrightarrow C_n[Br]+Li^++e^-$ (at 4.0-4.2V) and $LiCl+C_n[Br] \leftrightarrow C_n[BrCl]+Li^++e^-$ (at 4.2-4.5V), corresponding to each of the electrode active materials, where n is a non-zero real number. The peak currents at the redox electrode potentials represent the level of the electrochemical utilization of the electrode active materials.

Figure 8:
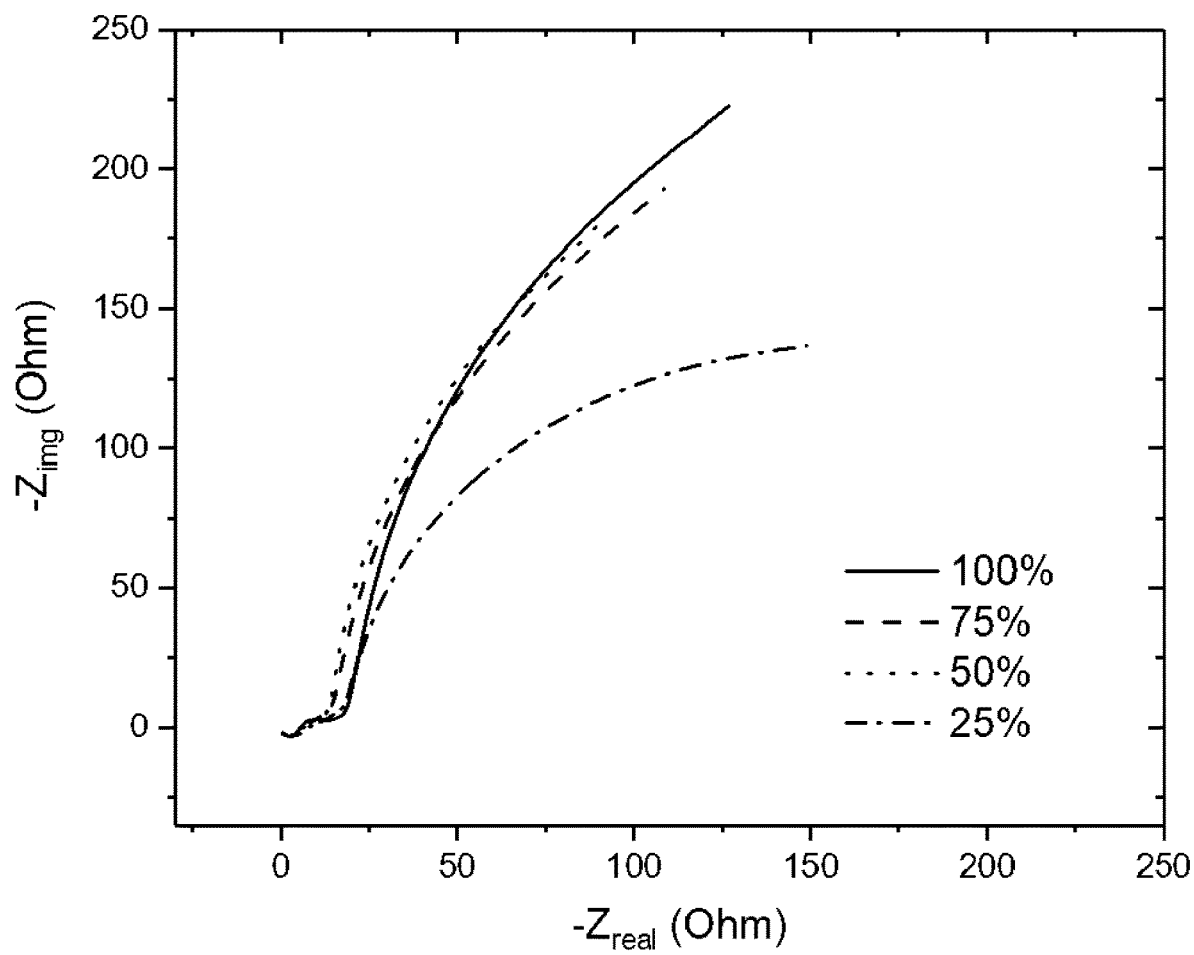
FIG. 8 is a Nyquist plot for an exemplary electrochemical cell according to the present disclosure.

FIG. 8 shows a Nyquist plot for an electrochemical cell prepared according to the above method, obtained by EIS (Electrochemical Impedance Spectroscopy) tests at various volume percentage of carbon dioxide gas within the cell housing. The EIS measurement is performed using a 5 mV perturbation with frequency in the range 0.01-100,000 Hz at room temperature. The width of the semicircle represents the charge transfer resistance of the electrochemical cells. The cell at 25 vol. % of the carbon dioxide shows the largest charge transfer resistance, whereas the cell at 50 vol. % of the carbon dioxide shows the smallest. The charge transfer resistance may be used as an indicator in evaluating the rate capability of the cell. The higher rate capability allows faster charging time and higher specific power.

Figure 9:
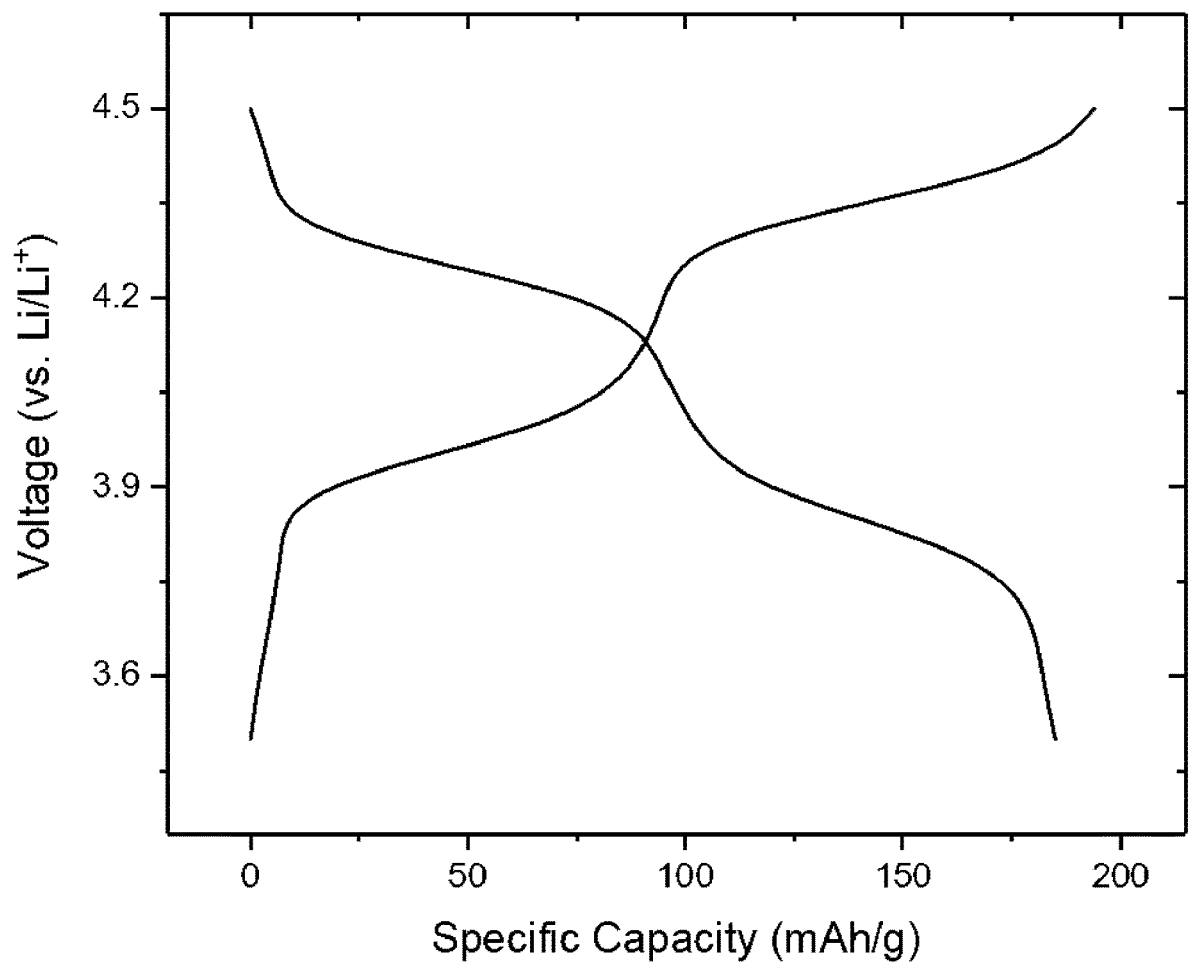
FIG. 9 is a galvanostatic charge/discharge profile of an exemplary electrochemical cell according to the present disclosure.

FIG. 9 shows a galvanostatic charge discharge profile of an electrochemical cell prepared according to the above method. The profile shows two different plateaus during charging or discharging, each of which corresponds to a redox reaction of the electrode active material as described above using CV. The cell reaches near 200 mAh/g of specific capacity normalized by the mass of the electrode active materials and near 99% of the coulombic efficiency. Together with the high average operating voltage (>4V), the cell may easily obtain an energy density of around 400 Wh/kg.

Figure 10:
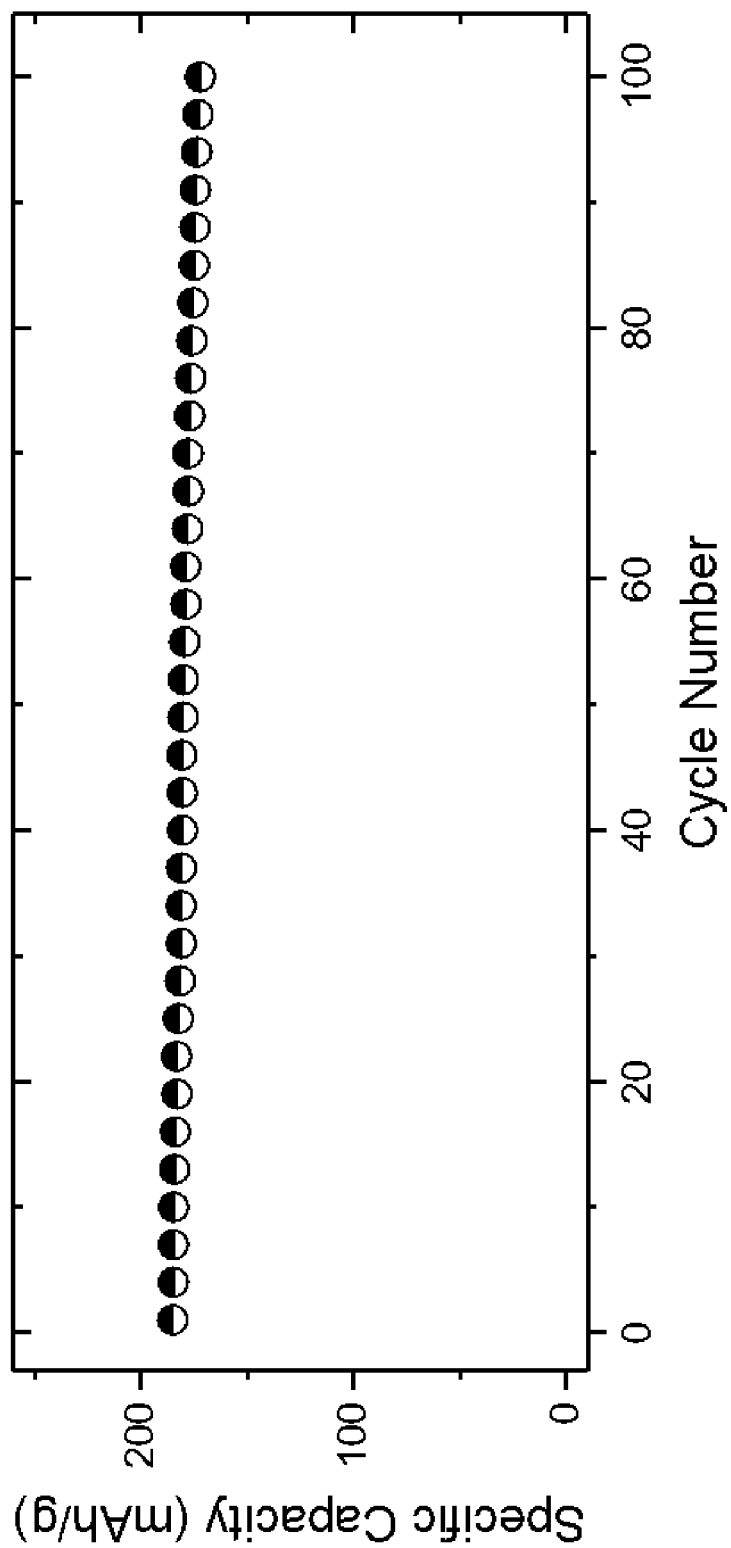
FIG. 10 is a plot showing the discharge capacities during cycling of an exemplary electrochemical cell according to the present disclosure.

FIG. 10 shows discharge capacities during cycling of an electrochemical cell prepared according to the above method. The cell demonstrates its superior rechargeability maintaining over 90% of its original discharge capacity at its $100^{th}$ cycle.

Example 2. Illustrative Embodiments

This section describes additional aspects and features of the disclosed apparatus, systems, and methods presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. An electrochemical cell, comprising an electrode including an electrode active material; an electrolyte including an electrolytic solvent; and a housing that encloses the electrode and electrolyte under a gaseous atmosphere, wherein the gaseous atmosphere includes a greenhouse gas; where the electrolyte is in contact with the electrode, and the electrode active material has a solubility of at least 0.01 M in the electrolytic solvent.

A2. The electrochemical cell of paragraph A1, further including an additional electrode that includes an additional electrode active material.

A3. The electrochemical cell of paragraph A1, where the electrolytic solvent includes water or a nitrogenous organic compound.

A4. The electrochemical cell of paragraph A1, where the electrolyte includes at least one additional solvent and/or solute.

A5. The electrochemical cell of paragraph A1, where the electrode active material includes one or more metals and/or metal complexes.

A6. The electrochemical cell of paragraph A5, wherein the electrode active material includes a metal complex of a halogen, or a metal complex of an organic compound.

A7. The electrochemical cell of paragraph A5, where the electrode active material includes one or more of chlorine and bromine.

A8. The electrochemical cell of paragraph A5, where the electrode active material includes one or more of lithium, sodium, potassium, beryllium, magnesium, calcium, vanadium, iron, nickel, copper, zinc, aluminum, and ions thereof.

A9. The electrochemical cell of paragraph A5, where the electrode active material includes lithium, chlorine, and bromine.

A10. The electrochemical cell of paragraph A5, where the electrode active material further includes inorganic carbon.

A11. The electrochemical cell of paragraph A1, further including a current collector that is in electrical contact with the electrode, the current collector including a metal alloy of one or more of molybdenum, titanium, and zirconium.

A12. The electrochemical cell of paragraph A1, further including a separator.

A13. The electrochemical cell of paragraph A1, where one or both of the electrode and the additional electrode includes a coating layer that coats an outer surface of the electrode active material or additional electrode active material, wherein the coating layer includes oxygen or sulfur.

A14. The electrochemical cell of paragraph A1, where the electrode further comprises one or more of an electrically-conductive material, a carboxylic acid, a plasticizer, and a polymeric binder.

A15. The electrochemical cell of paragraph A14, where the electrically-conductive material includes a porous inorganic carbon material.

A16. The electrochemical cell of paragraph A15, wherein the porous inorganic carbon material includes one or more of carbon black, carbon nanotubes, carbon nanofibers, carbon dots, activated carbon, graphite, graphene, graphene oxide, and graphene nanoribbons.

A17. The electrochemical cell of paragraph A15, where the electrode comprises an electrically-conductive material that is doped with one or more heteroatoms selected from boron, nitrogen, sulfur, phosphorous, fluorine, chlorine, and bromine.

A18. The electrochemical cell of paragraph A2, where the additional electrode comprises one or more of an electrically-conductive material, a carboxylic acid, a plasticizer, and a polymeric binder.

A19. The electrochemical cell of paragraph A1, where the greenhouse gas is a liquid, is in contact with the electrolyte, and/or is dissolved in the electrolyte.

A20. The electrochemical cell of claim 1, wherein the greenhouse gas includes one or more of carbon dioxide ($CO_2$), carbon monoxide (CO), ozone ($O_3$), methane ($CH_4$), tetrafluoromethane ($CF_4$), hexafluoroethane ($C_2F_6$), sulfur hexafluoride ($SF_6$), carbon tetrachloride ($CCl_4$), nitrous oxide ($N_2O$), nitrogen dioxide ($NO_2$), sulfur dioxide ($SO_2$), carbon disulfide ($CS_2$), and carbonyl sulfide (COS).

CONCLUSION

The disclosure set forth above may encompass multiple distinct examples with independent utility. Although each of these has been disclosed in one or more illustrative form(s), the specific embodiments thereof as disclosed and illustrated herein are not to be considered in a limiting sense, because numerous variations are possible without departing from the scope of the appended claims.

The subject matter of the present disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An electrochemical cell, comprising:
a positive electrode comprising a current collector in electrical contact with a cathode active material layer comprising a cathode active material and an electrically-conductive material, wherein the cathode active material includes a metal or a metal complex, where the metal is lithium, sodium, potassium, beryllium, magnesium, calcium, vanadium, iron, nickel, copper, zinc, or aluminum; and wherein the electrically-conductive material includes one or more porous inorganic carbon materials selected from the group consisting of carbon black, carbon nanotubes, carbon nanofibers, carbon dots, activated carbon, graphite, graphene, graphene oxide, and graphene nanoribbons;
an electrolyte solution comprising a first electrolytic solvent selected from the group consisting of water and a nitrogenous organic compound;
a negative electrode comprising an anode active material layer comprising an anode active material that includes a metal or a metal complex, where the metal is lithium, sodium, potassium, beryllium, magnesium, calcium, vanadium, iron, nickel, copper, zinc, or aluminum; the negative electrode being separated from the positive electrode by the electrolyte solution, and
a housing that encloses the positive electrode, the negative electrode, and the electrolyte solution under a gaseous atmosphere, wherein the gaseous atmosphere includes a greenhouse gas;
wherein the current collector is in electrical contact with the positive electrode and is positioned on a side of the positive electrode opposite the electrolyte solution, the electrolyte solution is in contact with the positive electrode, and the cathode electrode active material has a solubility of at least 0.01 M in the first electrolytic solvent.

2. The electrochemical cell of claim 1, wherein the electrolyte solution further comprises a second electrolytic solvent that is dimethylacetamide, acetonitrile, dimethylsulfoxide, dimethylformamide, or dimethylamine.

3. The electrochemical cell of claim 1, wherein the cathode active material comprises the metal complex that comprises a halogen or an organic compound.

4. The electrochemical cell of claim 3, wherein the metal complex comprises chlorine or bromine.

5. The electrochemical cell of claim 1, wherein the current collector includes one or more metal alloys selected from the group consisting of molybdenum, titanium, and zirconium.

6. The electrochemical cell of claim 1, further comprising a separator disposed between the positive electrode and the negative electrode and in contact with the electrolyte.

7. The electrochemical cell of claim 1, wherein the positive electrode further comprises one or more additional materials selected from the group consisting of a carboxylic acid, a plasticizer, and a polymeric binder.

8. The electrochemical cell of claim 7, wherein the electrically-conductive material of the positive electrode is doped with one or more heteroatoms selected from the group consisting of boron, nitrogen, sulfur, phosphorous, fluorine, chlorine, and bromine.

9. The electrochemical cell of claim 1, wherein both the cathode active material and the anode active material are present as particles.

10. The electrochemical cell of claim 1, wherein the negative electrode comprises one or more additional materials selected from the group consisting of a carboxylic acid, a plasticizer, and a polymeric binder.

11. The electrochemical cell of claim 1, wherein the greenhouse gas is additionally present in the housing as a liquid that is in contact with the electrolyte, or the greenhouse gas is dissolved in the electrolyte, or both.

12. The electrochemical cell of claim 1, wherein the greenhouse gas includes one or more greenhouse gases selected from the group consisting of carbon dioxide ($CO_2$), carbon monoxide (CO), ozone ($O_3$), methane ($CH_4$), tetrafluoromethane ($CF_4$), hexafluoroethane ($C_2F_6$), sulfur hexafluoride ($SF_6$), carbon tetrachloride ($CCl_4$), nitrous oxide ($N_2O$), nitrogen dioxide ($NO_2$), sulfur dioxide ($SO_2$), carbon disulfide ($CS_2$), and carbonyl sulfide (COS).

* * * * *